(12) United States Patent
Dindi et al.

(10) Patent No.: US 8,894,838 B2
(45) Date of Patent: *Nov. 25, 2014

(54) HYDROPROCESSING PROCESS USING UNEVEN CATALYST VOLUME DISTRIBUTION AMONG CATALYST BEDS IN LIQUID-FULL REACTORS

(75) Inventors: Hasan Dindi, Wilmington, DE (US); Brian Paul Lamb, Wilmington, DE (US); Luis Eduardo Murillo, Wilmington, DE (US); Brian Boeger, Westwood, KS (US); Jeffrey D. Caton, Blue Springs, MO (US)

(73) Assignee: E I du Pont de Nemours and Company, Wilmington, DE (US)

( * ) Notice: Subject to any disclaimer, the term of this patent is extended or adjusted under 35 U.S.C. 154(b) by 521 days.

This patent is subject to a terminal disclaimer.

(21) Appl. No.: 13/097,694

(22) Filed: Apr. 29, 2011

(65) Prior Publication Data

US 2012/0273391 A1    Nov. 1, 2012

(51) Int. Cl.
| | |
|---|---|
| *C10G 65/02* | (2006.01) |
| *B01J 8/04* | (2006.01) |
| *C10G 45/22* | (2006.01) |
| *C10G 65/04* | (2006.01) |
| *C10G 65/12* | (2006.01) |
| *C10G 65/10* | (2006.01) |

(52) U.S. Cl.
CPC .............. *B01J 8/0457* (2013.01); *B01J 8/0492* (2013.01); *C10G 45/22* (2013.01); *C10G 65/04* (2013.01); *C10G 65/12* (2013.01); *C10G 65/10* (2013.01); *B01J 2208/025* (2013.01); *B01J 2208/027* (2013.01); *C10G 2300/4081* (2013.01); *C10G 2300/4018* (2013.01); *C10G 2300/1051* (2013.01); *C10G 2300/1055* (2013.01); *C10G 2300/1059* (2013.01); *C10G 2300/802* (2013.01); *C10G 2400/04* (2013.01)
USPC ................................ 208/49; 208/59; 208/100

(58) Field of Classification Search
USPC ............................................... 208/49, 100, 59
See application file for complete search history.

(56) References Cited

U.S. PATENT DOCUMENTS

| | | | |
|---|---|---|---|
| 3,876,530 A | 4/1975 | Frayer et al. | |
| 3,907,667 A | 9/1975 | Murphy, Jr. et al. | |
| 3,926,784 A | 12/1975 | Christman et al. | |
| 3,936,370 A | 2/1976 | Henke et al. | |
| 3,940,330 A | 2/1976 | Beuther et al. | |
| 4,069,137 A * | 1/1978 | Greenwood | 208/65 |

(Continued)

FOREIGN PATENT DOCUMENTS

| | | |
|---|---|---|
| CN | 1609172 A | 4/2005 |
| CN | 1990834 A | 7/2007 |

(Continued)

OTHER PUBLICATIONS

PCT International Search Report and Written Opinion mailed Sep. 17, 2012.

*Primary Examiner* — Prem C Singh
*Assistant Examiner* — Brandi M Doyle

(57) ABSTRACT

The present invention provides a process for hydroprocessing hydrocarbons with uneven catalyst volume distribution among two or more catalyst beds. The process operates as a liquid-full process, wherein all of the hydrogen dissolves in the liquid phase. Hydrocarbons can be converted in the process to provide a liquid product including clean fuels with multiple desired properties such as low density and high cetane number.

23 Claims, 2 Drawing Sheets

(56) References Cited

U.S. PATENT DOCUMENTS

| | | |
|---|---|---|
| 4,187,168 A | 2/1980 | McVicker |
| 4,869,808 A | 9/1989 | Vora et al. |
| 5,332,492 A | 7/1994 | Maurer et al. |
| 6,123,835 A | 9/2000 | Ackerson et al. |
| 6,428,686 B1 | 8/2002 | Ackerson et al. |
| 6,881,326 B2 | 4/2005 | Ackerson et al. |
| 7,288,686 B2 | 10/2007 | Ryu |
| 7,291,257 B2 | 11/2007 | Ackerson et al. |
| 7,569,136 B2 | 8/2009 | Ackerson et al. |
| 2005/0006283 A1* | 1/2005 | Leung et al. ............ 208/213 |
| 2006/0144756 A1* | 7/2006 | Ackerson et al. ........ 208/108 |
| 2008/0289996 A1* | 11/2008 | Gupta et al. ............ 208/59 |
| 2009/0095651 A1* | 4/2009 | Leonard et al. .......... 208/49 |
| 2009/0321319 A1* | 12/2009 | Kokayeff et al. ........ 208/164 |
| 2010/0326884 A1 | 12/2010 | Petri et al. |

FOREIGN PATENT DOCUMENTS

| | | |
|---|---|---|
| JP | 1975050405 A | 5/1975 |
| JP | 1975148409 A | 11/1975 |
| WO | 98/05739 A1 | 2/1998 |
| WO | WO 98/05739 * | 2/1998 |
| WO | 03033136 A2 | 4/2003 |
| WO | 2006/102534 A2 | 9/2006 |

* cited by examiner

US 8,894,838 B2

HYDROPROCESSING PROCESS USING UNEVEN CATALYST VOLUME DISTRIBUTION AMONG CATALYST BEDS IN LIQUID-FULL REACTORS

FIELD OF THE INVENTION

The present invention relates to a liquid-full process for hydroprocessing hydrocarbon feeds with uneven catalyst volume distribution among multiple catalyst beds.

BACKGROUND OF THE INVENTION

Global demand for clean fuels, such as ultra-low-sulfur-diesel (ULSD), has risen quickly because many environmental regulations have been established to substantially lower the sulfur levels of fuels in order to reduce sulfur dioxide ($SO_2$) emissions from use of such fuels.

Hydroprocessing processes have been used to treat hydrocarbon feeds to produce clean fuels. Such processes include hydrodesulfurization (HDS) and hydrodenitrogenation (HDN), which remove sulfur and nitrogen, respectively, from the feeds.

Conventional hydroprocessing processes use trickle bed reactors, in which hydrogen is transferred from a vapor phase through a liquid phase hydrocarbon feed to react with the feed at the surface of a solid catalyst. Thus, three phases (gas, liquid and solid) are present. Trickle bed reactors are expensive to operate and require large quantities of hydrogen, much of which must be recycled through expensive hydrogen compressors. Heat removal from the highly exothermic hydroprocessing processes is inefficient. Significant coke forms on the surfaces of catalysts in trickle bed reactors, causing catalyst deactivation.

Ackerson, in U.S. Pat. No. 6,123,835, discloses a two-phase hydroprocessing system which eliminates the need to circulate hydrogen through the catalyst. In the two-phase hydroprocessing system, a solvent or a recycled portion of hydroprocessed liquid effluent acts as diluent and is mixed with a hydrocarbon feed. Hydrogen is dissolved in the feed/diluent mixture to provide hydrogen in the liquid phase. All of the hydrogen required in the hydroprocessing reaction is available in solution.

Petri, in U.S. patent application with Pub. No. US 2010/0326884, discloses a hydroprocessing process utilizing staged hydroprocessing reaction zones. Petri discloses that at least the initial reaction zone is a substantially three-phase hydroprocessing zone. Petri also discloses that a hydrocarbon feed is divided into portions, and a portion of untreated fresh feed mixed with a treated effluent is supplied to each reaction zone. The above treated effluent acts as a diluent and hydrogen source.

It is desirable to have a process for hydroprocessing hydrocarbon feeds in a smaller and simpler system with a reduced recycle ratio and enhanced sulfur and nitrogen conversion. It is also desirable to have a process for hydroprocessing to produce clean fuels with multiple desirable properties such as low density and high cetane number.

SUMMARY OF THE INVENTION

The present invention provides a process for hydroprocessing a hydrocarbon feed, which comprises: (a) providing two or more catalyst beds disposed in sequence and in liquid communication, wherein each catalyst bed contains a catalyst having a catalyst volume, the catalyst volume increasing in each subsequent catalyst bed; (b) contacting the feed with (i) a diluent and (ii) hydrogen, to produce a feed/diluent/hydrogen mixture, wherein the hydrogen is dissolved in the mixture to provide a liquid feed; (c) contacting the feed/diluent/hydrogen mixture with a first catalyst in a first catalyst bed, to produce a product effluent; (d) contacting a product effluent with a final catalyst in a final catalyst bed, to produce a final product effluent, wherein the product effluent contacted with the final catalyst is the product effluent from the catalyst bed immediately prior to the final catalyst bed; preferably a ratio of the volume of the first catalyst to the volume of the final catalyst is in the range of about 1:1.1 to about 1:10; and wherein each contacting step (c) and (d) is performed under liquid-full reaction conditions.

Optionally, the process of the present invention further comprises (e) recycling a portion of the final product effluent as a recycle product stream for use in the diluent in step (b)(i) at a recycle ratio of from about 0.1 to about 10, or at a recycle ratio of from about 0.1 to about 6, or at a recycle ratio of from about 0.1 to about 1. Recycle ratio is based on volume of recycle stream to volume of feed fed to a catalyst bed.

The process of this invention operates as a liquid-full process and each contacting step (c) and (f) is performed under liquid-full reaction conditions. By "liquid-full process", it is meant herein that all of the hydrogen added in the process for the hydroprocessing step can be dissolved in the process liquids. By "liquid-full reaction", it is meant no gas phase hydrogen is present during the reaction of contacting the hydrogen and feed with a catalyst.

DETAILED DESCRIPTION

Figure 1:
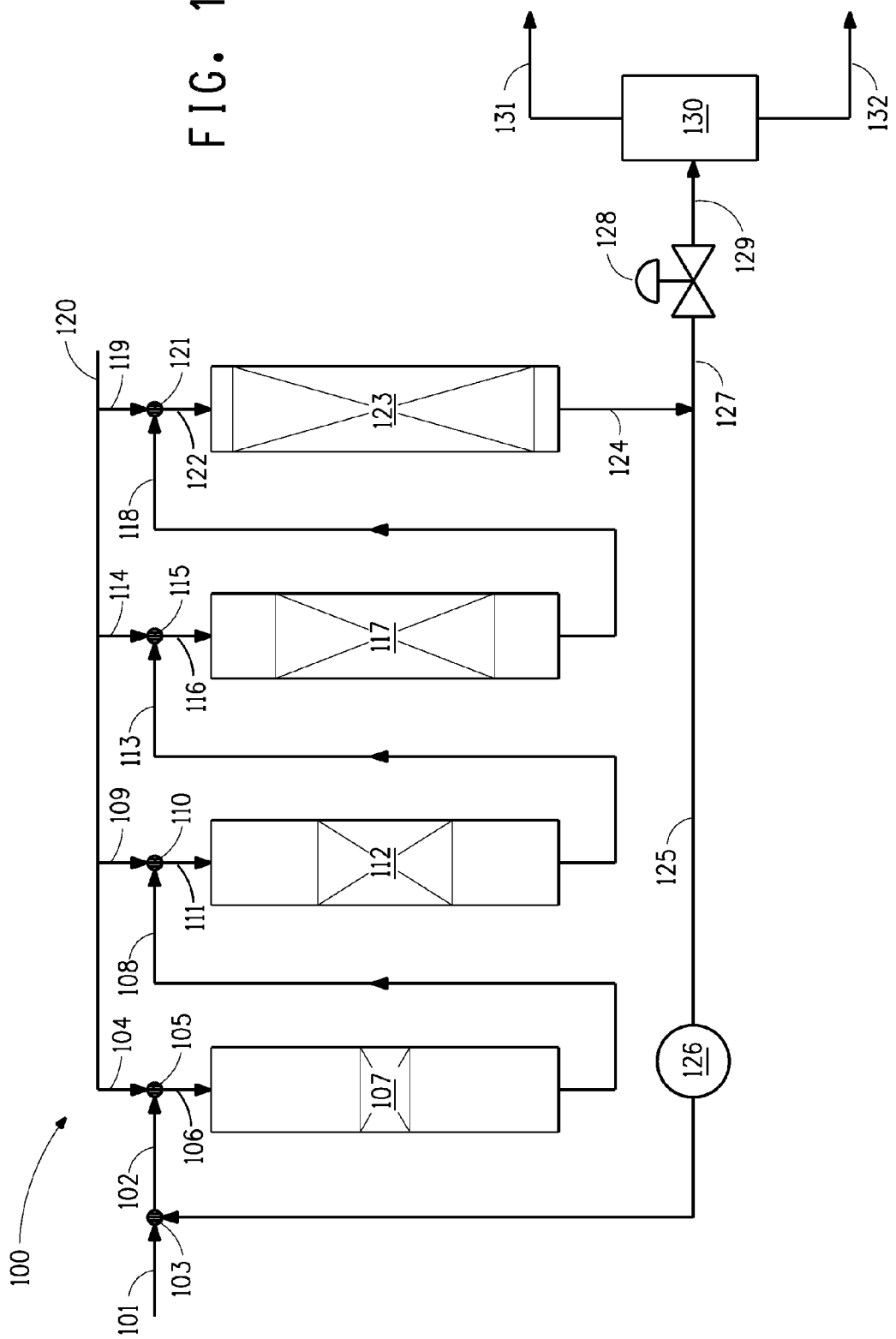
FIG. 1 is a flow diagram illustrating a hydrocarbon conversion process of this invention with uneven catalyst volume distribution.

The process of this invention is a liquid-full hydroprocessing process which provides improved conversion and quality of product relative to known processes. In this process, two or more catalyst beds are disposed in sequence and the catalyst volume increases in each subsequent catalyst bed. As a result, the hydrogen consumption is more evenly distributed among the beds.

Surprisingly when catalyst distribution is uneven and catalyst volume increases with each subsequent catalyst bed, the same catalyst and the same volume catalyst provides higher sulfur and nitrogen conversion as compared to an even catalyst volume distribution. As a result of higher conversion, the sulfur content of hydrocarbon feeds can be reduced to 8 ppm which meets Euro V specifications (<10 ppm) for ultra low sulfur diesel (ULSD), and nitrogen content is reduced to below 10 ppm.

The process of this invention comprises: (a) providing two or more catalyst beds disposed in sequence and in liquid communication, wherein each catalyst bed contains a catalyst having a catalyst volume, the catalyst volume increasing in each subsequent catalyst bed; (b) contacting the feed with (i) a diluent and (ii) hydrogen, to produce a feed/diluent/hydrogen mixture, wherein the hydrogen is dissolved in the mixture to provide a liquid feed; (c) contacting the feed/diluent/hydrogen mixture with a first catalyst in a first catalyst bed, to produce a product effluent; (d) contacting a product effluent with a final catalyst in a final catalyst bed, to produce a final product effluent, wherein the product effluent contacted with the final catalyst is the product effluent from the catalyst bed immediately prior to the final catalyst bed. Each contacting step (c) and (d) is performed under liquid-full reaction conditions.

Optionally, the process of the present invention further comprises (e) recycling a portion of the final product effluent as a recycle product stream for use in the diluent in step (b) at a recycle ratio of from about 0.1 to about 10, or at a recycle ratio of from about 0.1 to about 6, or at a recycle ratio of from about 0.1 to about 1. Even at the lower recycle ratios, conversion is improved relative to processes under similar conditions, but with a constant catalyst volume across multiple beds.

In step (a), any number of catalyst beds of two or more may be used. An upper limit of the number of beds may be based on practical reasons such as controlling cost and complexity in the hydroprocessing unit. Two or more catalyst beds are used, for example two to ten beds, or two to four beds.

In one embodiment, two catalyst beds are present in the process of the present invention. The catalyst volume of the first catalyst bed is smaller than the catalyst volume of the second catalyst bed. The product effluent from the first catalyst bed is directed to the second catalyst bed, which is the final catalyst bed. Optionally, a portion of the product effluent from the second catalyst bed is recycled as a recycle product stream to the first catalyst bed.

More than two catalyst beds may be present in the process of the present invention. One or more catalyst beds are present between the first catalyst bed and the final catalyst bed. The catalyst volume increases in each subsequent catalyst bed. Product effluent from a catalyst bed is directed to a subsequent catalyst bed. For example, the product effluent from the first catalyst bed is directed to a second catalyst bed. When the process comprises an optional recycle step, a portion of the product effluent from a final catalyst bed, is directed to one of the previous catalyst beds.

The process of this invention can be performed in stages. By stages it is meant one or more catalyst beds may be grouped together as a stage. When two or more stages are present, a portion of product effluent from a bed may be recycled to the same or a preceding bed within a single stage or a portion of product effluent from a subsequent stage may be recycled to a catalyst bed in a preceding stage as a recycle product stream. For example, a second stage effluent may be recycled to a first stage or within the second stage. If a recycle step is performed in a latter stage, any preceding stage will also have a recycle step, and the recycle ratio will be smaller in a subsequent stage than in a preceding stage. Recycle ratios for recycle product stream to the feed are within the ranges previously recited.

Catalyst beds of the present invention may be in a single column reactor with multiple catalyst beds so long as the beds are distinct and separated. Preferably hydrogen can be fed to a location between the beds to increase hydrogen content in the product effluent between the beds. Fresh hydrogen can be added into the liquid feed/diluent/hydrogen mixture or effluent from a preceding catalyst bed at the inlet of each catalyst bed, where the added hydrogen dissolves in the mixture or effluent prior to contacting the catalyst bed.

Each reactor is a fixed bed reactor and may be of a plug flow, tubular or other design packed with a solid catalyst (i.e. a packed bed reactor). A reactor can be a single column reactor with one or more catalyst beds. Each reactor operates as a liquid-full reactor, in which all of the hydrogen is dissolved in the liquid phase and the reactor is free of a gas phase. The liquid feed/diluent/hydrogen mixture passes through the catalyst.

In the step (b) of the process of the present invention, a feed is contacted with a diluent and hydrogen. The feed can be contacted first with hydrogen and then with the diluent, or preferably, first with the diluent and then with hydrogen to produce a feed/diluent/hydrogen mixture. The feed/diluent/hydrogen mixture is contacted with a first catalyst in a first catalyst bed to produce a first product effluent.

The combination of feed and diluent is capable of dissolving all of the hydrogen in the liquid phase, without need for hydrogen in the gas phase. That is, the hydroprocessing process of this invention is liquid-full process.

For example, each catalyst bed may have a zone above the catalyst into which a feed/diluent/hydrogen mixture is introduced prior to contacting the mixture with the catalyst. Additional hydrogen gas may be added to this zone, and mixed and/or flashed with the mixture so that the hydrogen is dissolved in the mixture. To achieve liquid-full reaction zones with introduction of hydrogen, the hydrogen gas is contacted with feed, diluent and/or feed diluent combinations. If necessary a separator may be present to remove excess hydrogen gas from feed/diluent/hydrogen mixtures to maintain the process as a liquid-full process.

The diluent typically comprises, consists essentially of, or consists of a recycled product stream. The recycle stream is a portion of the product effluent that is recycled and combined with the hydrocarbon feed before or after contacting the feed with hydrogen, preferably before contacting the feed with hydrogen.

The diluent may comprise any organic liquid that is compatible with the hydrocarbon feed and catalysts. When the diluent comprises an organic liquid, preferably the organic liquid is a liquid in which hydrogen has a relatively high solubility. The diluent may comprise an organic liquid selected from the group consisting of light hydrocarbons, light distillates, naphtha, diesel and combinations of two or more thereof. More particularly, the organic liquid is selected from the group consisting of recycled product stream, propane, butane, pentane, hexane or combinations thereof. The diluent is typically present in an amount of no greater than 90%, based on the total weight of the feed and diluent, preferably 20-85%, and more preferably 50-80%. Preferably, the diluent consists of recycled product stream, including dissolved light hydrocarbons.

In the hydroprocessing process of this invention, organic nitrogen and organic sulfur are converted to ammonia and hydrogen sulfide, respectively, in one or more of the contracting steps (c) and (d). There is no separation of ammonia, hydrogen sulfide and remaining hydrogen from the product effluent from the first catalyst bed or the product effluent from the preceding bed prior to feeding the effluent to the subsequent bed. The resulting ammonia and hydrogen sulfide after the hydroprocessing steps are dissolved in the liquid product effluent. A recycled product stream is combined with fresh feed without separating ammonia and hydrogen sulfide and remaining hydrogen from the final product effluent. Still, the catalysts throughout the hydroprocessing process of the present invention do not exhibit deactivation or coking on the catalyst surface.

Optionally, at least a portion of the liquid product effluent from a reaction stage can be directed to a high pressure separator or a flash unit where waste gases such as $H_{2S}$ and $NH_3$ are removed to produce a stripped stream before the stripped stream is directed to a subsequent reaction stage.

Stripping improves catalyst efficiency of the subsequent reaction stage(s), as sulfur and nitrogen conversions are increased.

In the present invention, hydrogen is recycled with the recycled product stream.

At least a portion of the final product effluent from step (f) is directed to a control valve where the final product effluent is flashed to atmospheric pressure to produce a flashed stream. If a final recycle stream is used only a portion of the final product effluent is directed to the control valve. If there is no final recycle stream, all of the product effluent is directed to the control valve. The flashed stream is directed to a separator, where lighter products (such as light naphtha, hydrogen sulfide, ammonia, $C_1$ to $C_4$ gaseous hydrocarbons and the like) are separated from the main liquid product, which is collected and called Total Liquid Product (TLP).

The hydrocarbon feed can be any hydrocarbon composition containing undesirable amounts of contaminants (sulfur, nitrogen, metals) and/or aromatics and/or having a viscosity of at least 0.5 cP, a density of at least 750 kg/m$^3$ at a temperature of 15.6° C. (60° F.), and an end boiling point in the range of from about 350° C. (660° F.) to about 700° C. (1300° F.). The hydrocarbon feed can be mineral oil, synthetic oil, petroleum fractions, or combinations of two or more thereof. A petroleum fraction is jet fuel, kerosene, straight run diesel, light cycle oil, light coker gas oil, gas oil, heavy cycle oil, heavy coker gas oil, heavy gas oil, any other petroleum distillate, resid, diesel fuel, deasphalted oil, waxes, lubes, specialty products, or combinations of two or more thereof. Preferably, the hydrocarbon feed is selected from the group consisting of jet fuel, kerosene, straight run diesel, light cycle oil, light coker gas oil, gas oil, heavy cycle oil, heavy coker gas oil, heavy gas oil, resid, deasphalted oil, and combinations of two or more thereof. The process of this invention can be used to convert such feeds to a product that meets ULSD specifications. The hydrocarbon feed is not divided into portions in the hydroprocessing process of the present invention.

The process of the present invention can operate under a wide variety of conditions, from light, to mild and to extreme. Temperature for the hydroprocessing process of this invention ranges from about 204° C. to about 450° C., preferably from about 300° C. to about 450° C., more preferably from about 300° C. to about 400° C. Pressure for the hydroprocessing process of this invention ranges from about 3.45 MPa (34.5 bar) to 17.3 MPa (173 bar).

The hydrocarbon feed is fed to the first catalyst bed at a rate to provide a liquid hourly space velocity (LHSV) of from about 0.1 to about 10 hr$^{-1}$, preferably, about 0.4 to about 8 hr$^{-1}$, more preferably about 0.4 to about 5.0 hr$^{-1}$.

The hydroprocessing process of this invention uses two or more catalyst beds, wherein each catalyst bed contains a catalyst. Each catalyst is a hydrotreating catalyst or hydrocracking catalyst. By "hydrotreating", it is meant herein a process in which a hydrocarbon feed reacts with hydrogen for the removal of heteroatoms, such as sulfur, nitrogen, oxygen, metals and combinations thereof, or for hydrogenation of olefins and/or aromatics, in the presence of a hydrotreating catalyst. By "hydrocracking", it is meant herein a process in which a hydrocarbon feed reacts with hydrogen for breaking carbon-carbon bonds to form hydrocarbons of lower average boiling point and lower average molecular weight in the presence of a hydrocracking catalyst.

In one embodiment, at least one catalyst is a hydrotreating catalyst. In another embodiment, at least one catalyst is a hydrocracking catalyst. Each catalyst may be a hydrotreating catalyst. One or more catalyst beds which contain a hydrotreating catalyst may be followed by one or more catalyst beds which contain a hydrocracking catalyst.

A hydrotreating catalyst comprises a metal and an oxide support. The metal is a non-precious metal selected from the group consisting of nickel, cobalt and combinations thereof, preferably combined with molybdenum and/or tungsten. The hydrotreating catalyst support is a mono- or mixed-metal oxide, preferably selected from the group consisting of alumina, silica, titania, zirconia, kieselguhr, silica-alumina and combinations of two or more thereof.

A hydrocracking catalyst also comprises a metal and an oxide support. The metal is also a non-precious metal selected from the group consisting of nickel, cobalt and combinations thereof, preferably combined with molybdenum and/or tungsten. The hydrocracking catalyst support is a zeolite, amorphous silica, or a combination thereof.

Preferably the metal for the catalysts used in the present invention is a combination of metals selected from the group consisting of nickel-molybdenum (NiMo), cobalt-molybdenum (CoMo), nickel-tungsten (NiW) and cobalt-tungsten (CoW).

Catalysts for use in the present invention may further comprise other materials including carbon, such as activated charcoal, graphite, and fibril nanotube carbon, as well as calcium carbonate, calcium silicate and barium sulfate.

Catalysts for use in the present invention include known commercially available hydroprocessing catalysts. It is within the scope of the present invention that more than one type of hydroprocessing catalyst be used in a single column reactor with multiple beds.

Preferably, the catalyst is in the form of particles, more preferably shaped particles. By "shaped particle" it is meant the catalyst is in the form of an extrudate. Extrudates include cylinders, pellets, or spheres. Cylinder shapes may have hollow interiors with one or more reinforcing ribs. Trilobe, cloverleaf, rectangular- and triangular-shaped tubes, cross, and "C"-shaped catalysts can be used. Preferably a shaped catalyst particle is about 0.25 to about 13 mm (about 0.01 to about 0.5 inch) in diameter when a packed bed reactor is used. More preferably, a catalyst particle is about 0.79 to about 6.4 mm (about 1/32 to about 1/4 inch) in diameter. Such catalysts are commercially available.

The catalysts may be sulfided before and/or during use by contacting the catalyst with a sulfur-containing compound at an elevated temperature. Suitable sulfur-containing compound include thiols, sulfides, disulfides, $H_2S$, or combinations of two or more thereof. The catalyst may be sulfided before use ("pre-sulfiding") or during the process ("sulfiding") by introducing a small amount of a sulfur-containing compound in the feed or diluent. The catalysts may be pre-sulfided in situ or ex situ and the feed or diluent may be supplemented periodically with added sulfur-containing compound to maintain the catalysts in sulfided condition.

DETAILED DESCRIPTION OF THE FIGURES

FIG. 1 provides an illustration for one embodiment of the hydroprocessing process of this invention. Certain detailed features of the proposed process, such as pumps, compressors, separation equipment, feed tanks, heat exchangers, product recovery vessels and other ancillary process equipment are not shown for the sake of simplicity and in order to demonstrate the main features of the process. Such ancillary features will be appreciated by one skilled in the art. It is further appreciated that such ancillary and secondary equipment can be easily designed and used by one skilled in the art without any difficulty or undue experimentation or invention.

FIG. 1 illustrates an integrated hydroprocessing unit 100. Fresh hydrocarbon feed 101 is combined with a portion of recycle product stream 125 from fourth catalyst bed 123 effluent 124, through pump 126 at mixing point 103, to provide combined liquid feed 102. Hydrogen gas 104 is mixed with combined liquid feed 102 at mixing point 105 to introduce sufficient hydrogen to saturate combined liquid feed 102. The resulting combined liquid feed/hydrogen mixture 106 flows into first catalyst bed 107 (bed 1).

Main hydrogen head 120 is the source for hydrogen make-up to the three catalyst beds 107 (bed 1), 112 (bed 2), 117 (bed 3) and 123 (bed 4).

Effluent 108 from first catalyst bed 107 is mixed with additional fresh hydrogen gas 109 at mixing point 110 to provide combined liquid stream 111, which flows to second catalyst bed 112 (bed 2).

Effluent 113 from second catalyst bed 112 is mixed with additional fresh hydrogen gas 114 at mixing point 115 to provide combined liquid stream 116, which flows to third catalyst bed 117 (bed 3).

Effluent 118 from third catalyst bed 117 is mixed with additional fresh hydrogen gas 119 at mixing point 121 to provide combined liquid stream 122, which flows to fourth catalyst bed 123 (bed 4).

Effluent 124 from fourth catalyst bed 123 is split wherein a portion of effluent 124 is returned to first catalyst bed 107 as recycle product stream 125 through pump 126 to mixing point 103. The ratio of recycle product stream 125 to fresh hydrocarbon feed 101 is between 0.1 and 10 (the recycle ratio).

The other portion 127 of effluent 124 is sent to control valve 128. Portion 127 of effluent 124 flows through control valve 128, to provide effluent 129, which is fed to separator 130. Gases 131 are removed from top of separator 130. Total liquid product 132 is removed from the bottom of separator 130. Total liquid product 132 may be fractioned (distilled) elsewhere to separate a lighter cut from a heavier blending stock.

The liquid flow (feed, diluent, including recycle product stream, and hydrogen) in FIG. 1 is illustrated as downflow through the beds 1-4. Preferably the feed/diluent/hydrogen mixture and product effluents are fed to the reactors in an downflow mode. An upflow process is also contemplated herein.

Figure 2:
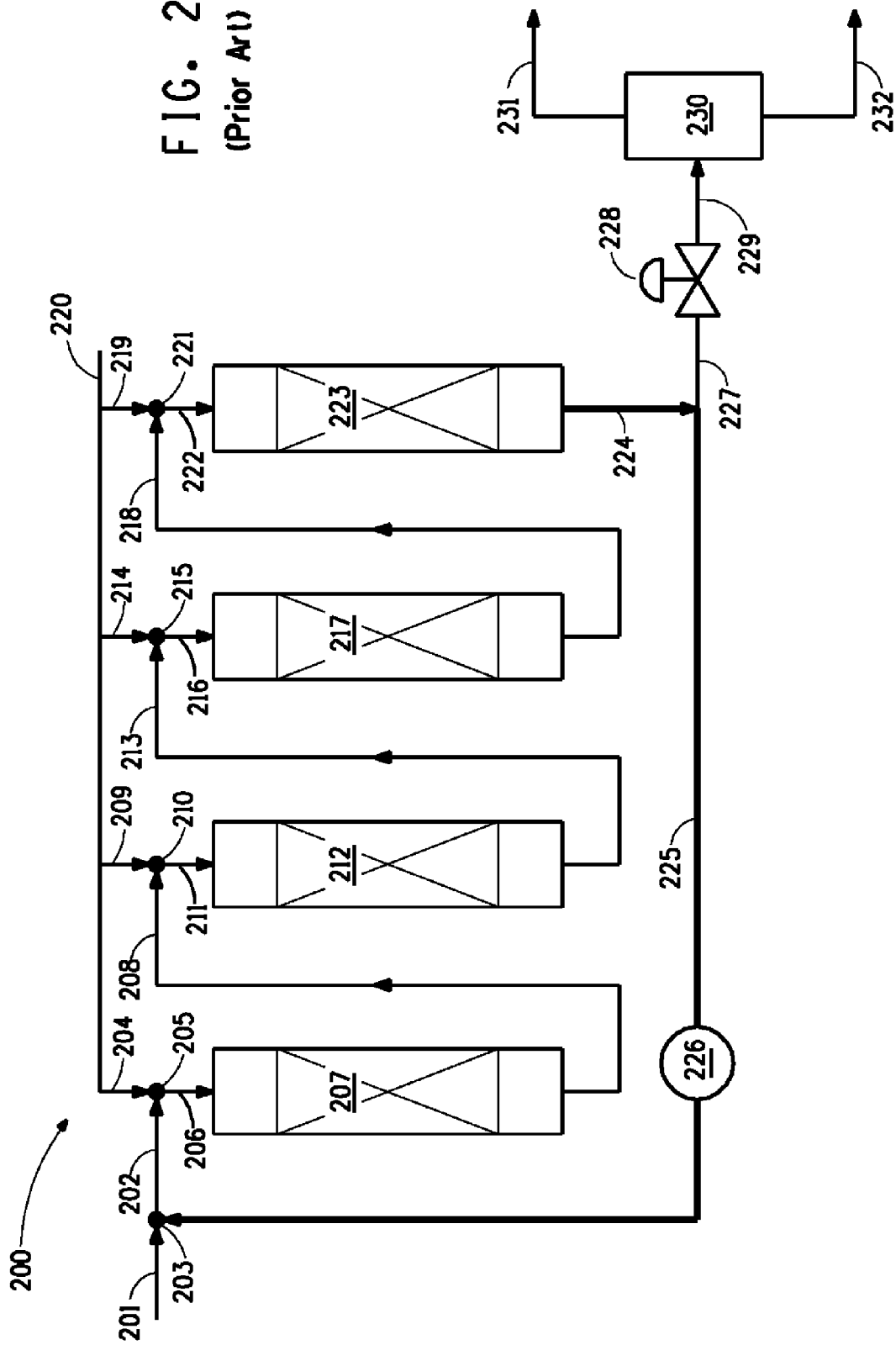
FIG. 2 is a flow diagram illustrating a comparative hydrocarbon conversion process with even catalyst volume distribution.

The drawing in FIG. 1 illustrates that the catalyst bed volume increases from first catalyst bed 107 to fourth catalyst bed 123 at each successive step, although not intended to be drawn to scale, to convey the difference in catalyst loading in comparison with the even distribution case displayed in FIG. 2.

FIG. 2 illustrates a comparative hydrocarbon processing unit 200. FIG. 1 illustrates a flow diagram for the process of the present invention containing four reactors (or catalyst beds) with increasing catalyst volume from the first to the fourth bed. In contrast, FIG. 2 illustrates a flow diagram for a current state-of-the-art process containing four reactors with equal catalyst volume. A number of four reactors in FIGS. 1 and 2 was chosen only as an example and the number of reactors may vary and the invention still apply.

FIG. 2 displays the catalyst beds 207, 212, 217, and 223 to be of similar size, although not intended to be drawn to scale, to convey the difference in catalyst loading in comparison with the uneven distribution case shown in FIG. 1. In addition, the required higher recycle ratio needed for this even distribution setup is highlighted by using a thicker line on the recycle stream 225, to indicate that it needs to be larger in size to satisfy the larger hydrogen consumption in catalyst bed 207.

Fresh hydrocarbon feed 201 is introduced to the process and combined with recycled product stream 225 of effluent 224 from fourth catalyst bed 223 (bed 4) at mixing point 203. Hydrogen gas 204 is mixed with the combined liquid feed 202 at mixing point 205 to add sufficient hydrogen to saturate the combined liquid feed. The resulting combined liquid feed/recycled product stream/hydrogen mixture 206 flows into first catalyst bed 207 (bed 1).

Main hydrogen head 220 is the source for hydrogen make-up to the beds.

Effluent 208 from bed 207 is mixed with additional fresh hydrogen gas 209 at mixing point 210. Combined liquid-stream 211 flows to second catalyst bed 212 (bed 2). Effluent 213 from second catalyst bed 212 is mixed with more hydrogen 214 at mixing point 215. Combined liquid stream 216 flows to third catalyst bed 217 (bed 3). Effluent 218 from bed 217 is mixed with additional fresh hydrogen gas 219 at mixing point 221. Combined liquid-stream 222 flows to fourth catalyst bed 223 (bed 4).

Effluent 224 from fourth catalyst bed 223 is split. A portion of effluent 224 is recycle product stream 225, which is returned to the inlet of bed 207 through pump 226 to mixing point 203 to provide combined liquid feed 202. The ratio of recycle product stream 225 to fresh hydrocarbon feed 201 is preferably between 0.1 and 10 (the recycle ratio).

The other portion 227 of effluent 224 is sent to control valve 228. Portion 227 of effluent 224 flows through control valve 228, to provide effluent 229, which is fed to separator 230. Gases 231 are removed from top of separator 230. Total liquid product 232 is removed from the bottom of separator 230. Total liquid product 232 may be fractioned (distilled) elsewhere to separate a lighter cut from a heavier blending stock.

EXAMPLES

Analytical Methods and Terms

ASTM Standards. All ASTM Standards are available from ASTM International, West Conshohocken, Pa., www.astm.org.

Amounts of sulfur, nitrogen and basic nitrogen are provided in parts per million by weight, wppm.

Total Sulfur was measured using ASTM D4294 (2008), "Standard Test Method for Sulfur in Petroleum and Petroleum Products by Energy Dispersive X-ray Fluorescence Spectrometry," DOI: 10.1520/D4294-08 and ASTM D7220 (2006), "Standard Test Method for Sulfur in Automotive Fuels by Polarization X-ray Fluorescence Spectrometry," DOI: 10.1520/D7220-06.

Total Nitrogen was measured using ASTM D4629 (2007), "Standard Test Method for Trace Nitrogen in Liquid Petroleum Hydrocarbons by Syringe/Inlet Oxidative Combustion and Chemiluminescence Detection," DOI: 10.1520/D4629-07 and ASTM D5762 (2005), "Standard Test Method for Nitrogen in Petroleum and Petroleum Products by Boat-Inlet Chemiluminescence," DOI: 10.1520/D5762-05.

Aromatic content was determined using ASTM Standard D5186-03 (2009), "Standard Test Method for Determination of Aromatic Content and Polynuclear Aromatic Content of Diesel Fuels and Aviation Turbine Fuels by Supercritical Fluid Chromatography", DOI: 10.1520/D5186-03R09.

Boiling range distribution was determined using ASTM D2887 (2008), "Standard Test Method for Boiling Range Distribution of Petroleum Fractions by Gas Chromatography," DOI: 10.1520/D2887-08.

Density, Specific Gravity and API Gravity were measured using ASTM Standard D4052 (2009), "Standard Test Method for Density, Relative Density, and API Gravity of Liquids by Digital Density Meter," DOI: 10.1520/D4052-09.

"API gravity" refers to American Petroleum Institute gravity, which is a measure of how heavy or light a petroleum liquid is compared to water. If API gravity of a petroleum liquid is greater than 10, it is lighter than water and floats; if less than 10, it is heavier than water and sinks. API gravity is thus an inverse measure of the relative density of a petroleum liquid and the density of water, and is used to compare relative densities of petroleum liquids.

The formula to obtain API gravity of petroleum liquids from specific gravity (SG) is:

API gravity=(141.51/SG)−131.5

Cetane index is useful to estimate cetane number (measure of combustion quality of a diesel fuel) when a test engine is not available or if sample size is too small to determine this property directly. Cetane index was determined by ASTM Standard D4737 (2009a), "Standard Test Method for Calculated Cetane Index by Four Variable Equation," DOI: 10.1520/D4737-09a.

Bromine Number is a measure of aliphatic unsaturation in petroleum samples. Bromine Number was determined using ASTM Standard D1159, 2007, "Standard Test Method for Bromine Numbers of Petroleum Distillates and Commercial Aliphatic Olefins by Electrometric Titration," DOI: 10.1520/D1159-07.

"LHSV" means liquid hourly space velocity, which is the volumetric rate of the liquid feed divided by the volume of the catalyst, and is given in $hr^{-1}$.

Refractive Index (RI) was determined using ASTM Standard D1218 (2007), "Standard Test Method for Refractive Index and Refractive Dispersion of Hydrocarbon Liquids," DOI: 10.1520/D1218-02R07.

"WABT" means weighted average bed temperature.

The following examples are presented to illustrate specific embodiments of the present invention and not to be considered in any way as limiting the scope of the invention.

Examples 1-3

A straight run diesel received directly from a commercial refinery having the properties shown in Table 1 was hydroprocessed in an experimental pilot unit containing a set of two fixed bed reactors in series.

Each fixed bed reactor was of 19 mm (¾") OD 316L stainless steel tubing and about 49 cm (19¼") in length with reducers to 6 mm (¼") on each end. Both ends of the reactors were first capped with metal mesh to prevent catalyst leakage. Below the metal mesh, the reactors were packed with layers of 1 mm glass beads at both ends. A desired volume of the catalyst was packed in the mid-section of the reactor.

Reactors #1 and #2 contained a hydrotreating catalyst for hydrodearomatization (HDA), hydrodesulfurization (HDS) and hydrodenitrogenation (HDN). About 40 and 80 ml of catalyst were loaded in the first and second reactors, respectively. The catalyst, KF-767, was a Co—Mo on γ-$Al_2O_3$ catalyst from Albemarle, Corp., Baton Rouge, La. KF-767 consisted of quadralobes of about 1.3 mm diameter and 10 mm long.

Each reactor was placed in a temperature controlled sand bath, consisting of a 120 cm long pipe filled with fine sand having a 7.6 cm (3") OD. Temperatures were monitored at the inlet and outlet of each reactor as well as in each sand bath. Temperature in each reactor was controlled using heat tape wrapped around the 7.6 cm OD sand bath pipe and connected to temperature controllers.

TABLE 1

Properties of the Straight Run Diesel

| Property | Unit | Value |
|---|---|---|
| Total Sulfur | wppm | 439 |
| Total Nitrogen | wppm | 49 |
| Refractive Index at 20° C. | | 1.4582 |
| Density at 20° C. (68° F.) | g/ml | 0.8191 |
| Density at 15.56° C. (60° F.) | g/ml | 0.8223 |
| API Gravity | | 22.2 |
| Bromine No. | g/100 g | <0.5 |
| Aromatics | | |
| Monoaromatics | wt % | 19 |
| Polyaromatics | wt % | 5 |
| Total Aromatics | wt % | 24 |
| Boiling range distribution | % | ° C. |
| IBP = Initial boiling point | IBP | 111 |
| | 5 | 119 |
| | 10 | 131 |
| | 20 | 167 |
| | 30 | 197 |
| | 40 | 222 |
| | 50 | 242 |
| | 60 | 266 |
| | 70 | 289 |
| | 80 | 313 |
| | 90 | 347 |
| | 95 | 371 |
| | 99 | 415 |
| FBP = Final boiling point | FBP | 430 |

The hydrotreating catalyst (a total of 180 ml) was charged to the reactors and was dried overnight at 115° C. under a total flow of 300 standard cubic centimeters per minute (sccm) of hydrogen gas. The reactors were heated to 176° C. with flow of charcoal lighter fluid (CLF) through the catalyst beds. Sulfur spiked-CLF (1 wt % sulfur, added as 1-dodecanethiol) and hydrogen gas mixture was passed through the reactors at 176° C. to pre-sulfide the catalysts.

The pressure was 6.9 MPa (1000 psig or 69 bar). The temperature of the reactors was increased gradually to 320° C. Pre-sulfiding was continued at 320° C. until breakthrough of hydrogen sulfide ($H_2S$) was observed at the outlet of Reactor #2.

After pre-sulfiding, the catalyst was stabilized by flowing a straight run diesel (SRD) through the catalysts in the reactors at a temperature varying from 320° C. to 355° C. and at pressure of 6.9 MPa (1000 psig or 69 bar) for about 12 hours.

After pre-sulfiding and stabilizing the catalyst with SRD at a pressure of 6.9 MPa, SRD was pre-heated to 50° C., and was pumped to Reactor #1 and then through Reactor #2 using an Eldex positive displacement pump at a flow rate of 3 ml/minute for a hydrotreating LHSV of 1.5 $hr^{-1}$. The total hydrogen feed rate was 30 normal liters of hydrogen gas per liter (N l/l) of fresh hydrocarbon feed (167 scf/bbl). The temperature of Reactors #1 and #2 (weighted average bed temperature or WABT) was 338° C. (640° F.) and the pressure was about 4.6 MPa (675 psig, 46 bar). The recycle ratio was 1.0. The reactors were maintained under the above conditions for at least 12 hours to achieve steady state so that the catalyst was fully precoked and the system was lined-out with the straight run diesel while testing for both total sulfur and density.

Hydrogen was fed from compressed gas cylinders and the flow was measured using mass flow controllers. Hydrogen was injected and mixed with the straight run diesel and the recycle product stream before Reactor #1. The combined straight run diesel/hydrogen/recycle product stream mixture flowed downwardly through a first temperature-controlled sand bath and then in an up-flow mode through Reactor #1. After exiting Reactor #1, additional hydrogen was injected in the effluent of Reactor #1 (feed to Reactor #2). The feed to Reactor #2 flowed downwardly through a second temperature-controlled sand bath and then in an up-flow mode through Reactor #2. After exiting Reactor #2, the effluent was split into a recycle stream and a product stream. The liquid recycle stream flowed through a piston metering pump, to join a fresh hydrocarbon feed at the inlet of the first reactor. The recycle product stream served as diluent in this Example.

Examples 2 and 3 were conducted under similar conditions to those in Example 1, except that Examples 2 and 3 were run at lower temperatures of 321° C. (610° F.) and 304° C. (580° F.), respectively.

A Total Liquid Product (TLP) sample and an off-gas sample were collected for each Example under the steady state conditions. The sulfur and the nitrogen contents were measured and overall material balances were calculated by using GC-FID to account for light ends in the off-gas. Results for Examples 1-3 are provided in Table 2.

From the total hydrogen feed and hydrogen in the off-gas, the hydrogen consumption was calculated to be 21.7 l/l (122 scf/bbl), 20.7 l/l (116 scf/bbl) and 17.4 l/l (98 scf/bbl) for Example 1, Example 2 and Example 3, respectively.

In Example 1, the sulfur and nitrogen contents of the TLP sample were 8 ppm and 4 ppm, respectively. The reduced sulfur level of 8 ppm was within the Euro V specifications (<10 ppm) for ULSD level.

All of the nitrogen species present in the feed was of carbazole type, which are considered "hard nitrogen species" to reduce to single digit wppm level, which is necessary to reach the extremely low levels of sulfur required for ULSD, due to competition for active catalyst sites.

Examples 2 and 3 were conducted at lower temperatures in order to better compare these results to those obtained in the Comparative Examples A-C using equal catalyst volume in each bed.

TABLE 2

Summary for Examples 1 to 3

| Example | LHSV hr$^{-1}$ | WABT °C. | RR | Density$^{15.6°\ C.}$ g/cc | S wppm | N wppm | Aromatics | | | H$_2$ Cons. N l/l (scf/bbl) |
| --- | --- | --- | --- | --- | --- | --- | --- | --- | --- | --- |
| | | | | | | | Mono wt % | Poly wt % | Total wt % | |
| Feed | | | | 0.8223 | 439 | 49 | 19.0 | 5.0 | 24.0 | |
| 1 | 1.5 | 338 | 1 | 0.8186 | 8 | 4 | 19.6 | 2.5 | 22.1 | 21.7 (122) |
| 2 | 1.5 | 321 | 1 | 0.8195 | 22 | 4 | 20.5 | 2.4 | 22.9 | 20.7 (116) |
| 3 | 1.5 | 304 | 1 | 0.8202 | 51 | 6 | 21.0 | 2.3 | 23.3 | 17.4 (98) |

Abbreviations:
RR is recycle ratio
H$_2$ Cons. is hydrogen consumption.

Results in Table 2 show that the sulfur and nitrogen conversions through the hydrotreating beds containing unevenly-distributed catalyst volumes for Examples 1-3 were 98, 95 and 85%, respectively. In all Examples, nitrogen levels were less than 10 ppm, and the sulfur levels were less than 50 ppm. Results also show that the density and total aromatic content of the feed were reduced significantly.

Comparative Examples A-C

The same straight run diesel having the properties shown in Table 1 was hydroprocessed in a pilot unit containing a set of two fixed bed reactors in series.

The reactors were packed with the same hydrotreating catalyst as described in Example 1. Examples 1-3 were repeated in Comparative Examples A-C with the following exceptions: in Comparative Examples A-C, Reactors #1 and #2, each contained 60 ml catalyst. In Comparative Examples A-C, the recycle ratio was increased to 3.5 in order to dissolve all the hydrogen required in Reactor #1. Each Comparative Example was run for 6 hours to achieve steady state. Results are shown in Table 3.

Catalysts were again dried and pre-sulfided, stabilized, and precoked as described in Example 1.

A Total Liquid Product (TLP) sample and an off-gas sample were collected for each Comparative Example under the steady state conditions. Hydrogen consumption rate was again calculated from the hydrogen feed and hydrogen in the off-gas. The total chemical hydrogen consumption rates were 16.9 l/l (95 scf/bbl), 14.4 l/l (81 scf/bbl), and 10.1 l/l (57 scf/bbl) for Comparative Examples A, B and C, respectively. The hydrogen consumption rates for the Comparative Examples were lower than those in Examples 1, 2 and 3 (see Table 2) indicating lower aromatic saturation in the case of even catalyst distribution.

TABLE 3

Summary for Comparative Examples A to C

| Comp. Example | LHSV hr$^{-1}$ | WABT °C. | RR | Density$^{15.6°\ C.}$ g/cc | S wppm | N wppm | Aromatics | | | H$_2$ Cons. N l/l (scf/bbl) |
|---|---|---|---|---|---|---|---|---|---|---|
| | | | | | | | Mono wt % | Poly wt % | Total wt % | |
| Feed | | | | 0.8223 | 439 | 49 | 19.0 | 5.0 | 24.0 | |
| A | 1.5 | 338 | 3.5 | 0.8201 | 30 | 7 | 20.1 | 2.6 | 22.7 | 16.9 (95) |
| B | 1.5 | 321 | 3.5 | 0.8208 | 45 | 8 | 20.7 | 2.5 | 23.2 | 14.4 (81) |
| C | 1.5 | 304 | 3.5 | 0.8215 | 82 | 13 | 20.9 | 3.1 | 24.0 | 10.1 (57) |

In Comparative Example A (a comparison for Example 1), sulfur and nitrogen contents of the TLP sample were 30 ppm, and 7 ppm, respectively. The density (at 15.6° C. or 60° F.) of the feed was reduced from 822.3 kg/m$^3$ to 820.1 kg/m$^3$ in the TLP. Both the sulfur and nitrogen levels were higher than those obtained in Example 1.

Total sulfur and nitrogen levels in Examples 1-3 were lower than those in Comparative Examples A-C, showing that the uneven (less in Reactor #1 and more in Reactor #2) catalyst distribution in the reactor beds improved sulfur and nitrogen conversions (HDS and HDN).

The products of Examples 1-3 have lower density and higher aromatic saturation than products of Comparative Examples A-C, which correspond to higher hydrogen consumption in Examples 1-3. Thus, uneven catalyst distribution in Examples 1-3 resulted in higher de-aromatization and higher volume swell (increased volumetric product yield due to reduction in density).

Results show uneven catalyst distribution has multiple advantages in hydroprocessing a hydrocarbon feed relative to an even catalyst distribution. Thus, higher sulfur, nitrogen and aromatic conversion levels are achieved when the first catalyst bed is packed with less volume of catalyst than that in the second and subsequent beds.

Examples 1-3 had a lower recycle ratio (1) than Comparative Examples A-C (recycle ratio of 3.5). Managing hydrogen consumption for essentially equal hydrogen consumption in each bed due to uneven catalyst distribution allows for minimizing the recycle ratio. A reduced recycle ratio results in increased sulfur, nitrogen, metal removal and increased aromatic saturation.

Examples 4-6

A 100% light cycle oil (LCO) from a FCC unit of a petroleum refinery having the properties shown in Table 4 was hydrotreated in a pilot unit having three reactors. Reactors #1, #2, and #3 contained a commercial Ni—Mo on γ-Al$_2$O$_3$ catalyst (KF-860) from Albemarle Corp., Baton Rouge, La. Reactor #1 contained 18 ml of catalyst. Reactor #2 contained 52 ml of catalyst. Reactor #3 contained 80 ml of catalyst. A total volume of 150 ml of catalyst was used. The catalyst was in the form of extrudates of a quadralobe about 1.3 mm diameter and 10 mm long.

In Examples 4-6, catalysts were dried and pre-sulfided as described in Example 1. After pre-sulfiding, the feed was changed to SRD to stabilize the catalyst as described in Example 1 at a constant temperature of 349° C. and at a pressure of 6.9 MPa (69 bar) for 12 hours in an initial pre-coking step. The feed was then switched to the LCO in order to complete pre-coking the catalysts by feeding LCO for at least 12 hours and testing for sulfur until the system has reached steady-state.

In Examples 4-6, LCO feed was pumped at a constant feed flow rate of 2.25 ml/min resulting in a LHSV of 0.9 hr$^{-1}$. Other process variables, as shown in Table 5, were as follows. The total hydrogen feed rate was 383 l/l (2150 scf/bbl). Pressure was 13.8 MPa (138 bar). The recycle ratio was 6. The unit was run at least for 6 hours to achieve steady state.

In Example 4, all three reactors were maintained at 366° C. (690° F.). In Example 5, the temperature (WABT) of the last reactor (Reactor #3) was lowered to 232° C. so that no appreciable reaction would take place in Reactor #3. In Example 6, the temperatures of the last two reactors (Reactors #2 and #3) were lowered to 232° C. so that only Reactor #1 would be active. Examples 4-6 provided the data of both the total hydrogen consumption and the hydrogen consumption distribution in each reactor.

Liquid product samples were collected under steady state conditions and were analyzed. Results are shown in Table 5.

TABLE 4

Properties of Light Cycle Oil

| Property | Unit | Measured |
|---|---|---|
| Sulfur content | wppm | 3860 |
| Nitrogen content | wppm | 910 |
| Density at 15.6° C. | g/ml | 0.9362 |
| Density at 20° C. | g/ml | 0.9331 |
| API Gravity | g/ml | 19.5 |
| Refractive Index at 20° C. | | 1.542 |
| Bromine Number | g/100 g | 8.3 |
| Cetane Index | | 26.2 |
| Aromatic content | | |
| Monoaromatics | wt % | 33.0 |
| Polyaromatics | wt % | 38.8 |
| Total Aromatics | wt % | 71.8 |
| Boiling range Distribution | | ° C. |
| Initial Boiling Point (IBP) | | 116 |
| 5% | | 195 |
| 10% | | 214 |
| 20% | | 236 |
| 30% | | 256 |

TABLE 4-continued

Properties of Light Cycle Oil

| | |
|---|---|
| 40% | 271 |
| 50% | 287 |
| 60% | 305 |
| 70% | 324 |
| 80% | 347 |
| 90% | 370 |
| 95% | 389 |
| 99% | 422 |
| End Point (EP) | 431 |

TABLE 4

Summary for Examples 4 to 6

| Example | LHSV hr$^{-1}$ | Recycle Ratio | WABT Rx 1, °C. | WABT Rx 2, °C. | WABT Rx 3, °C. | Density$^{20°C.}$ kg/m$^3$ | S wppm | N wppm | Tot. Arom. wt % | Cetane Index | H$_2$ Cons. N l/l (scf/bbl) |
|---|---|---|---|---|---|---|---|---|---|---|---|
| Feed | | | | | | 933 | 3860 | 910 | 71.8 | 26.2 | |
| 4 | 0.9 | 6 | 366 | 366 | 366 | 864 | 15 | 1 | 25.9 | 38.9 | 296 (1660) |
| 5 | 1.9 | 6 | 366 | 366 | 232 | 886 | 133 | 5 | 46.2 | 35.1 | 196 (1100) |
| 6 | 7.5 | 6 | 366 | 232 | 232 | 910 | 787 | 217 | 64.3 | 31.0 | 95 (530) |

Abbreviations:
Rx 1 is Reactor #1,
Rx 2 is Reactor #2, and
Rx 3 is Reactor #3.
Tot. Arom. is Total Aromatics.

TABLE 5

Catalyst Volume and Hydrogen Consumption Distribution for Examples 4 to 6

| | Reactor #1 | Reactor #2 | Reactor #3 | Total |
|---|---|---|---|---|
| Catalyst Volume (ml) | 18 | 52 | 80 | 150 |
| Catalyst Volume, % of Total | 12 | 35 | 53 | 100 |
| H$_2$ Consumption, N l/l | 95 | 101 | 100 | 296 |
| H$_2$ Consumption, % of Total | 32 | 34 | 34 | 100 |

Examples 4-6 represent a complete series conducted to determine the properties after hydrotreating, including the density, total sulfur content, total nitrogen content, total aromatic content, cetane index, the total chemical hydrogen consumption as well as the distribution of hydrogen consumption across each catalyst bed.

The catalyst volume and hydrogen consumption in each reactor are shown in Table 5. Total chemical hydrogen consumption is distributed equally across three catalyst beds. Equal hydrogen consumption allows use of the minimum recycle ratio required to supply sufficient amount of dissolved hydrogen to each reactor. Results with the reduced recycle ratio showed increased cetane number and better removal of sulfur and nitrogen. Hydrogen consumption was also higher resulting in more aromatic saturation and lower density (increased volume swell).

Examples 7-9

The same light cycle oil (LCO) feed used in Examples 4-6 was used in a two stage hydroprocessing treatment in a pilot unit having 4 reactors similar to the flow diagram as illustrated in FIG. 1. However, the pilot unit introduced feed, recycle streams and hydrogen in an upflow mode to the reactors.

A first stage included three reactors, Reactors #1, #2, and #3. A second stage included one reactor, Reactor #4.

The first three reactors were packed with the same hydrotreating catalyst (KF-860-1.3Q) with the same volumes (18 ml in Reactor #1, 52 ml in Reactor #2, and 80 ml in Reactor #3) as used in Examples 4-6. Reactor #4 was packed with 180 ml of a commercial hydrocracking catalyst, Ni—W on zeolite/γ-Al$_2$O$_3$ catalyst (KC 2610-1.5Q) from Albemarle Corp., Baton Rouge, La. A total volume of 150 ml of the hydrotreating catalyst was used. A total volume of 180 ml of the hydrocracking catalyst was used.

Catalysts were dried and pre-sulfided as described in Example 1. After pre-sulfiding, the feed was changed to SRD to stabilize the catalyst as described in Example 1 at a constant temperature of 349° C. and at a pressure of 6.9 MPa (69 bar) for 12 hours in an initial pre-coking step. The feed was then switched to the LCO in order to complete pre-coking the catalysts by feeding LCO for at least 12 hours and testing for sulfur until the system has reached steady-state.

In Example 7, LCO feed was pumped at a constant feed flow rate of 2.25 ml/min for a LHSV of 0.9 hr$^{-1}$ in the first stage and of 0.75 hr$^{-1}$ in the second stage. Feed rates as LHSV for Examples 8 and 9 are provided in Table 6, wherein the first number recited under the column headed LHSV, hr$^{-1}$, is the flow rate (as LHSV) of the first stage and the second number recited under the same column is the flow rate (as LHSV) of the second stage.

For all Examples 7-9, total hydrogen feed rate was 436 l/l (2450 scf/bbl). Pressure was 13.8 MPa (138 bar). The recycle ratio was 6, with a portion of the product from Reactor #4 recycled to mix with the LCO feed to Reactor #1. The unit was run at least for 6 hours to achieve steady state.

In Example 7, the first stage was at a temperature of 366° C. and the second stage was at 382° C. (720° F.). Temperatures for Examples 8 and 9 are provided in Table 6, wherein the first temperature recited under WABT, °C. column is the temperature of the first stage and the second temperature recited in the same column is the temperature of the second stage.

Liquid product samples were collected under steady state conditions and were analyzed. Results are shown in Table 6. Properties of the LCO feed are also shown In Table 6.

Based results from Examples 4-6, hydrogen consumption distribution through all four reactors can be calculated for Examples 7-9. Catalyst volume and hydrogen consumption in each reactor are shown in Table 7. Total chemical hydrogen consumption is distributed equally across the catalyst beds in the first stage. Hydrogen consumption in the fourth reactor (second stage) was lower because hydrocracking, as is known, involves less hydrogen consumption.

TABLE 6

Summary for Examples 7 to 9

| Example | LHSV hr$^{-1}$ | RR | WABT, °C. | Density$^{20°C.}$ kg/m$^3$ | Sulfur wppm | Nitrogen wppm | Mono Ar. wt % | Poly Ar. wt % | Tot. Ar. wt % | Cetane Index | H$_2$ Cons. N l/l (scf/bbl) |
|---|---|---|---|---|---|---|---|---|---|---|---|
| Feed | | | | 933 | 3860 | 910 | 33.0 | 38.8 | 71.8 | 26.2 | |
| 7 | 0.90/0.75 | 6 | 366/382 | 847 | 39 | 3 | 29.3 | 6.7 | 36.0 | 37.7 | 357 (2000) |
| 8 | 0.90/0.75 | 6 | 360/377 | 852 | 59 | 5 | 32.7 | 8.1 | 40.8 | 37.8 | 354 (1990) |
| 9 | 0.80/0.67 | 6 | 366/382 | 841 | 35 | 1 | 27.8 | 6.4 | 34.2 | 37.7 | 365 (2050) |

Abbreviations:
Mono. Ar. is Mono Aromatics.
Poly Ar. is Poly Aromatics.
Tot. Ar. is Total Aromatics.

TABLE 7

Catalyst and Hydrogen Consumption Distribution in Example 7

| | Reactor #1 | Reactor #2 | Reactor #3 | Reactor #4 | Total |
|---|---|---|---|---|---|
| Catalyst Volume (ml) | 18 | 52 | 80 | 180 | 330 |
| H$_2$ Consumption, N l/l | 95 | 101 | 100 | 61 | 357 |
| H$_2$ Consumption, % of Total | 27 | 28 | 28 | 17 | 100 |

Equal hydrogen consumption rates in each bed allows use of a minimum recycle ratio that is required to supply sufficient dissolved hydrogen to each catalyst bed. Reducing the recycle ratio also increases cetane number and increases removal of organic sulfur and nitrogen from the feed. The reduced recycle also resulted in reduced density of the liquid and provided a higher volume of product (increased volume swell).

The Examples demonstrates value and advantages of the process of this invention. Uneven catalyst volume distribution resulted in higher conversion when compared directly with even catalyst volume distribution (same catalyst, same amount of catalyst, and same reaction conditions). Results also showed ULSD product was achieved, which met Euro V specifications. Results also showed lower recycle ratio with same amount of catalyst leads to higher conversion.

What is claimed is:

1. A process for hydroprocessing a hydrocarbon feed, which comprises
   (a) providing two or more catalyst beds disposed in sequence and in liquid communication, wherein each catalyst bed is a fixed bed and contains a catalyst having a catalyst volume, the catalyst volume increasing in each subsequent catalyst bed;
   (b) contacting the feed with (i) a diluent and (ii) hydrogen, to produce a feed/diluent/hydrogen mixture, wherein the hydrogen is dissolved in the mixture to provide a liquid feed;
   (c) contacting the feed/diluent/hydrogen mixture with a first catalyst in a first catalyst bed, to produce a product effluent;
   (d) contacting a product effluent with a final catalyst in a final catalyst bed, to produce a final product effluent, wherein the product effluent contacted with the final catalyst is the product effluent from the catalyst bed immediately prior to the final catalyst bed;
wherein each contacting step of step (c) and step (d) is performed under liquid-full reaction conditions;
wherein the process is characterized by higher sulfur and nitrogen conversion as compared to an even catalyst volume distribution with the same catalyst and the same volume catalyst;
and wherein a ratio of the volume of the first catalyst to the volume of the final catalyst is in the range of about 1:1.1 to about 1:10.

2. The process of claim 1 wherein a distribution of the catalyst volumes among the catalyst beds is determined in a way so that the hydrogen consumption for each catalyst bed is essentially equal.

3. The process of claim 1 further comprises (e) recycling a portion of the final product effluent as a recycle product stream for use in the diluent in step (b)(i) at a recycle ratio of from about 0.1 to about 10.

4. The process of claim 3 wherein the recycle ratio is from about 0.1 to about 6.

5. The process of claim 4 wherein the recycle ratio is from about 0.1 to about 1.

6. The process of claim 1 wherein the hydrocarbon feed is mineral oil, synthetic oil, petroleum fractions, or combinations of two or more thereof.

7. The process of claim 6 wherein the hydrocarbon feed is selected from the group consisting of jet fuel, kerosene, straight run diesel, light cycle oil, light coker gas oil, gas oil, heavy cycle oil, heavy coker gas oil, heavy gas oil, resid, deasphalted oil, and combinations of two or more thereof.

8. The process of claim 1 wherein each catalyst bed has a temperature from about 204° C. to about 450° C., and a pressure from about 3.45 MPa (34.5 bar) to 17.3 MPa (173 bar), and a hydrocarbon feed rate to provide a liquid hourly space velocity (LHSV) of from about 0.1 to about 10 hr$^{-1}$.

9. The process of claim 1 wherein each catalyst bed has a temperature from about 300° C. to about 450° C., and a pressure from about 3.45 MPa (34.5 bar) to 17.3 MPa (173 bar), and a hydrocarbon feed rate to provide a liquid hourly space velocity (LHSV) of from about 0.4 to about 8 hr$^{-1}$.

10. The process of claim 1 wherein the diluent is selected from the group consisting of recycle product stream, light hydrocarbons, light distillates, naphtha, diesel, propane, butane, pentane, hexane and combinations thereof.

11. The process of claim 1 wherein at least one catalyst is a hydrotreating catalyst.

12. The process of claim 1 wherein at least one catalyst is a hydrocracking catalyst.

13. The process of claim 1 wherein each catalyst is a hydrotreating catalyst.

14. The process of claim 1 wherein each catalyst is a hydrocracking catalyst.

15. The process of claim 1 wherein one or more catalyst beds which contain a hydrotreating catalyst are followed by one or more catalyst beds which contain a hydrocracking catalyst.

16. The process of claim 1 wherein each catalyst comprises a metal which is a combination of metals selected from the group consisting of nickel-molybdenum (NiMo), cobalt-molybdenum (CoMo), nickel-tungsten (NiW) and cobalt-tungsten (CoW).

17. The process of claim 16 wherein each catalyst is sulfided.

18. The process of claim 1 wherein each catalyst is a hydrotreating catalyst or a hydrocracking catalyst and each catalyst comprises a metal and an oxide support wherein the metal is a non-precious metal.

19. The process of claim 1 wherein fresh hydrogen is added at the inlet of each catalyst bed.

20. The process of claim 1 wherein there is no separation of ammonia, hydrogen sulfide and remaining hydrogen from the product effluent from the first catalyst bed or the product effluent from a preceding catalyst bed prior to feeding the product effluent to a subsequent catalyst bed.

21. The process of claim 4 wherein the portion of the final product effluent is recycled without separating ammonia and hydrogen sulfide and remaining hydrogen from the final product effluent.

22. The process of claim 1 wherein ammonia and hydrogen sulfide are removed from at least a portion of a product effluent before the product effluent is contacted with a subsequent catalyst.

23. The process of claim 3 wherein hydrogen is recycled with the recycle product stream.

* * * * *